United States Patent
Butler et al.

(10) Patent No.: US 7,082,392 B1
(45) Date of Patent: Jul. 25, 2006

(54) MANAGEMENT OF SPEECH TECHNOLOGY MODULES IN AN INTERACTIVE VOICE RESPONSE SYSTEM

(75) Inventors: Nicholas David Butler, Romsey (GB); David Seager Renshaw, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 946 days.

(21) Appl. No.: 09/641,449

(22) Filed: Aug. 17, 2000

(30) Foreign Application Priority Data

Feb. 22, 2000 (GB) .................................. 0004097.2

(51) Int. Cl.
G10L 15/20 (2006.01)
G10L 15/22 (2006.01)

(52) U.S. Cl. ..................... 704/233; 704/255; 704/275

(58) Field of Classification Search ................ 704/251, 704/255, 257, 270, 270.1, 275, 277, 258, 704/260, 235; 379/88.01, 88.03, 88.04, 88.05, 379/88.06
See application file for complete search history.

(56) References Cited

U.S. PATENT DOCUMENTS

| | | | | |
|---|---|---|---|---|
| 5,615,296 A * | 3/1997 | Stanford et al. | .......... | 704/270.1 |
| 5,677,990 A * | 10/1997 | Junqua | ..................... | 704/255 |
| 5,754,978 A * | 5/1998 | Perez-Mendez et al. | .... | 704/255 |
| 5,805,771 A * | 9/1998 | Muthusamy et al. | ........ | 704/232 |
| 5,864,810 A * | 1/1999 | Digalakis et al. | .......... | 704/255 |
| 5,991,719 A * | 11/1999 | Yazaki et al. | ................ | 704/251 |
| 6,061,646 A * | 5/2000 | Martino et al. | ................ | 704/3 |
| 6,141,642 A * | 10/2000 | Oh | .............................. | 704/260 |
| 6,192,344 B1 * | 2/2001 | Lee et al. | ..................... | 704/277 |
| 6,408,272 B1 * | 6/2002 | White et al. | .............. | 704/270.1 |
| 6,418,411 B1 * | 7/2002 | Gong | ....................... | 704/256.5 |
| 6,487,533 B1 * | 11/2002 | Hyde-Thomson et al. | .. | 704/260 |
| 6,501,832 B1 * | 12/2002 | Saylor et al. | ............. | 379/88.04 |
| 6,519,332 B1 * | 2/2003 | Tovander | .................... | 379/196 |
| 6,526,380 B1 * | 2/2003 | Thelen et al. | ................ | 704/251 |
| 6,615,172 B1 * | 9/2003 | Bennett et al. | .............. | 704/257 |
| 6,701,293 B1 * | 3/2004 | Bennett et al. | .............. | 704/251 |
| 6,704,707 B1 * | 3/2004 | Anderson et al. | ........... | 704/231 |
| 6,718,178 B1 * | 4/2004 | Sladek et al. | ............... | 455/466 |
| 6,807,574 B1 * | 10/2004 | Partovi et al. | .............. | 709/224 |

FOREIGN PATENT DOCUMENTS

WO         WO 98/10413         12/1998

* cited by examiner

*Primary Examiner*—Martin Lerner
(74) *Attorney, Agent, or Firm*—Akerman Senterfitt

(57) ABSTRACT

This invention relates to the management, in an interactive voice response system, of a plurality of speech technology modules. In particular it relates to an apparatus and a method for dynamically determining which of a plurality of speech technology modules to use during voice interaction between the system and a user. In prior art IVR systems each speech technology module is configured for a specific application or task. Most speech technology modules have different lexicons for the range of functions but it is the full lexicon which can determine an engine's suitability for a language. For instance, one type of speech recognition engine is preferred for certain languages whereas IBM ViaVoice is a good general all rounder. Choosing one speech recognition module according to application or function alone is not entirely satisfactory and there is a need for improvement. The present solution is to select, for each interaction, one of the speech technology modules from the plurality of the modules to be used by the application according to the environment property of the interaction.

5 Claims, 2 Drawing Sheets

MANAGEMENT OF SPEECH TECHNOLOGY MODULES IN AN INTERACTIVE VOICE RESPONSE SYSTEM

FIELD OF INVENTION

This invention relates to the management, in an interactive voice response system, of a plurality of speech technology modules. In particular it relates to an apparatus and a method for dynamically determining which of a plurality of speech technology modules to use during voice interaction between the system and a user.

BACKGROUND OF INVENTION

In today's business environment, the telephone is used for many purposes: placing catalogue orders; checking airline schedules; querying prices; reviewing account balances; notifying customers of price or schedule changes; and recording and retrieving messages. Often, each telephone call involves a service representative talking to a caller, asking questions, entering responses into a computer, and reading information to the caller from a terminal screen. This process can be automated by substituting an interactive voice response system using recorded or synthesised voice for asking questions and reading information, and speech recognition for listening to the callers requests and replies.

An IVR may have more than one speech recognition engine so that for a particular interaction the best engine may be selected and used. Patent publication WO 98/10413 discloses a speech processing system and a method concerning a speech processing system which comprises a number of speech recognition modules and speech output modules which are each provided for a given type of speech recognition. Depending on the function required, the modules, are selected, activated and parameterized by a module selection-device.

However, focusing on the function of the particular interaction ignores that certain speech recognition engines are better than others for certain languages. Each module in the prior art is configured for a specific application. Most recognition engines have different lexicons for the range of functions but it is the full lexicon which can determine an engines suitability for a language. For instance, one type of speech recognition engine may be preferred for certain languages whereas IBM ViaVoice is a good general all rounder. Choosing one speech recognition module according to application alone is not entirely satisfactory when the application may be multilingual and there is a need for improvement.

SUMMARY OF INVENTION

In one aspect of the present invention there is provided an interactive voice response (IVR) system.

The capabilities of a recogniser required for a particular point in an application goes beyond simply the "task" that the application is trying to achieve and that it is also necessary to take into account the environment within which the application is currently operating. Relevant factors in the environment would include: the language of the dialog, the regional accent, and the characteristics of the telephone voice channel.

The environment is a property of each interaction and may be modified by the application programmer. The environment is also a property of the application. Knowledge of the actual speech recognition technology is not needed within the application since the speech recognition technology depends on the environment property which is part of the application. Furthermore the environment is dynamically modifiable property which may be changed by the application during execution.

A further complexity with speech recognition over the telephone is the type of phone network that the call originates from The characteristics of the voice channel from a land line telephone are different from that from a mobile telephone, and that from a telephone using Voice over IP (Internet telephony) is different again. This is due to the use of differing voice compression techniques. In order to provide accurate and reliable speech recognition it is necessary to have a language model for the recogniser that matches the characteristics of the voice channel, so a different model is needed for each of land line, mobile and IP telephony. In the prior art, it would be necessary to attach one recogniser for each of these language models to every call to allow for calls from all types of telephone.

BRIEF DESCRIPTION OF DRAWINGS

In order to promote a fuller understanding of this and other aspects of the present invention, an embodiment will now be described, by way of example only, with reference to the accompanying drawings in which.

DESCRIPTION OF PREFERRED EMBODIMENT

Figure 1:
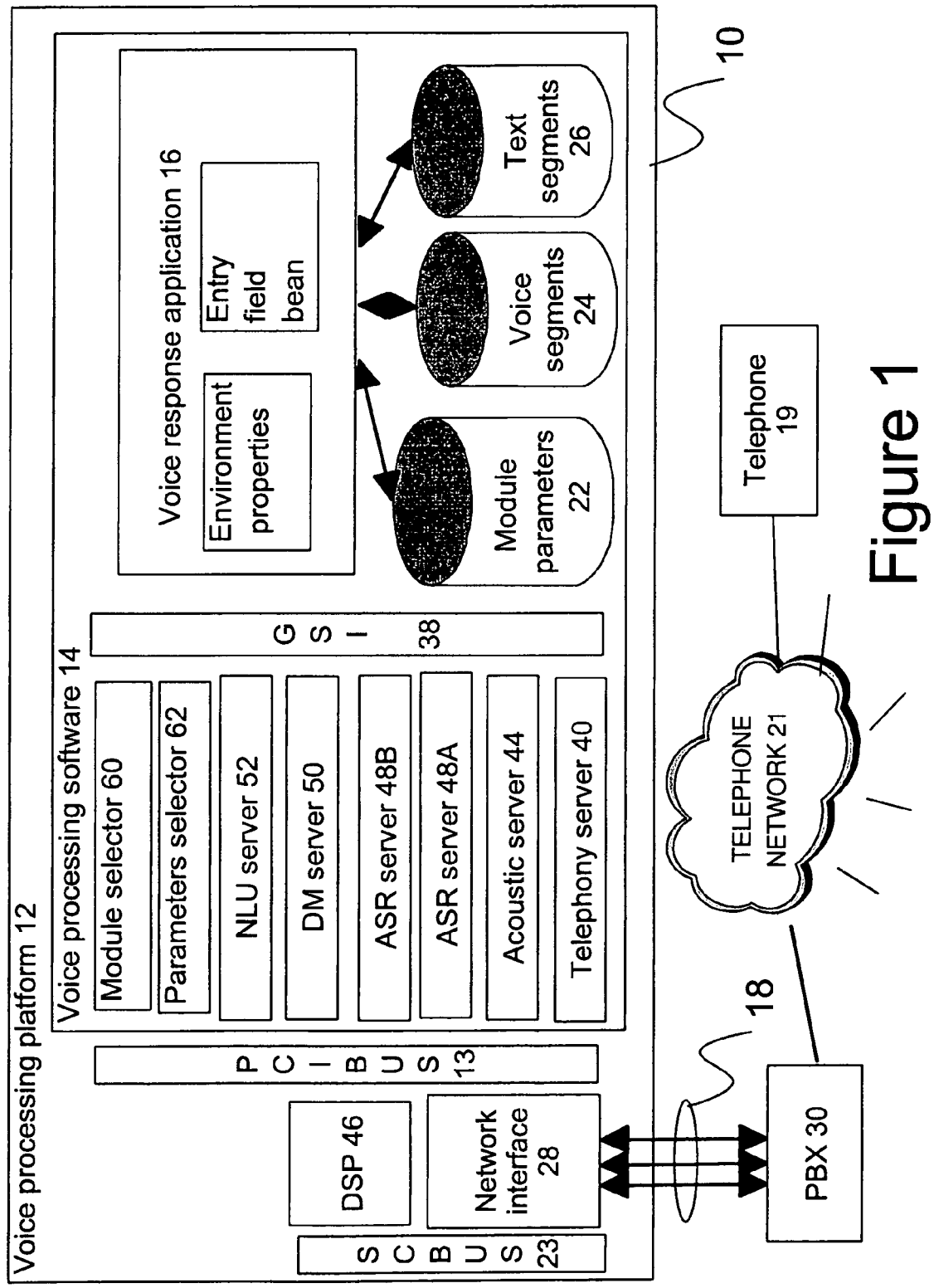
FIG. 1 represents an IVR platform with integrated ASR modules of the present embodiment.

Referring to FIG. 1, there is shown a schematic representation of a voice processing system 10 of the present embodiment comprising: voice processing platform 12 and voice processing software 14; and telephone lines 18. Voice processing system 10 supports up to 60 E1 or 48 T1 telephone lines 18 connected through network interface 28 to connect callers to the voice system. The telephone lines can come directly from the public telephone network or through a private branch exchange (PBX) 30. If call volumes require more than 60 E1 or 48 T1 lines, additional voice processing systems can be connected together through a LAN and managed from a single node.

The voice processing platform 12 comprises: a personal computer with an Industry Standard Architecture (ISA) bus or a Peripheral Component Interconnect (PCI) bus 13, running Microsoft Windows NT; one or more Dialogic or Aculab network interface cards 28 for connecting the required type and number of external telephone lines 18; and one or more Dialogic voice processing cards 46. A dedicated voice data bus, System Computing Bus (SCbus) 23, connects the network card 28 and the DSP card 46 which avoids data flow congestion on the PCI system bus and increases voice processing speed. A hardware Automated Speech Recognition (ASR) device would receive voice data over the SCbus 23.

The voice processing software 14 comprises IBM's DirectTalk Beans (previously known as Voice Response Beans) running on top of IBM's DirectTalk for Windows. Although the embodiment is described for Windows, an equivalent platform is also available for the UNIX environment from the IBM Corporation, in which case a maximum of 12 digital trunks per system (360 E1 or 288 T1 channels) may be supported. Used in conjunction with voice processing hardware, the voice processing software can connect to a Public Telephone Network directly or via a PBX. It is designed to meet the need for a fully automated, versatile, computer telephony system. DirectTalk Beans not only helps develop voice applications, but also provides a wealth of facilities to help run and manage them. DirectTalk Beans can be expanded into a networked system with centralized system management, and it also provides an open architectures allowing customisation and expansion of the system at both the application and the system level.

The voice processing software 14 comprises: a telephony server 40; speech recognition servers 48A and 48B; a dialogue manager (DM) server 50; a natural language understanding (NLU) server 52; a node manager (not shown); a general server interface 38; voice application 16; a module parameter database 22; voice segments 24; text segments 26; speech technology selector 60; and speech parameter selector 62. A general server interface 38 manages all communications between the component programs of voice processing software 14. A server is a program that provides services to the voice response application 16. The modular structure of the voice processing software 14 and the open architecture of the general server interface (GSI) allows development of servers that are unique to specific applications, for example, a user-defined server can provide a bridge between Voice Response and another product.

Telephony server 40 interfaces the network interface 28 and provides telephony functionality to the voice response application.

The speech recognition servers 48A and 48B are large-vocabulary, speaker-independent continuous ASRs such as IBM ViaVoice or Dragon System ASR. In this embodiment the speech recognition servers are the speech technology modules although speech recognition is only one example of a speech technology and other functions such as tone recognition or text to speech could be used as examples of the speech technology. Although the speech recognition servers 48A and 48B are performed in software for this embodiment, one or both could be embodied in hardware.

Natural language understanding (NLU) server 52 interprets the user's intention as expressed by key items (words or phrases) in the text output from the ASR. The NLU server is based on IBM ViaVoice NLU Toolkit.

DM server 50, based on IBM ViaVoice NLU Toolkit, compares the NLU output of the user's intentions against the information requirements of the specific application or service and directs the IVR application to play an appropriate response or prompt to the user.

The node manager allows monitoring of the status of application sessions and telephone lines and allows the issue of commands to start and stop application sessions.

Voice response application 16 controls the interaction between the voice system 10 and a caller. Applications comprise Telephony Java Beans, which incorporates the power and ease-of-use of Java programming language. A voice application controls the playing of recorded voice segments 24 or synthesized text segments 26. The voice processing system can run up to sixty applications simultaneously ranging from one voice response application running on all sixty lines to sixty different voice response applications 16 each running on a separate line.

Speech technology selector 60 consists of a mapping configuration of environment properties to speech recognition modules 48A and 48B. During initialisation, the speech technology selector 60 reads the configuration and loads it into a hash table with the environment (e.g. locale) as the key.

Speech parameter selector 62 has configuration information consisting of a series of mappings from a combination of environment and task to the corresponding recognition parameters. During initialisation, and optionally when updated at a later time, speech parameter selector 62 reads the configuration and loads it into a hash table using a combination of the Environment and Task as the key.

When the application runs and requires speech recognition, the current environment is passed to the speech technology selector 60. Speech technology selector 60 looks up the locale in the hash table and finds out which technology is required. The speech technology selector 60 creates an instance of the selected technology module and passes the request for speech recognition or text-to-speech to that instance.

The Speech parameter selector 62 then combines the Environment and Task to create a key for its configuration hash table, looks up the parameters for the required speech recognition. It then starts the recognition engine. Once the recognition technology is started, the voice response unit starts playing the prompt to the caller, possibly using text-to-speech, waits for a response from the recogniser and passes on the response at the end.

IBM DirectTalk Beans are fully compatible with the JavaBeans™ specification, allowing anyone who can use a visual application builder such as IBM VisualAge for Java, or the Java programming language, to provide a telephone interface to business applications. The DirectTalk Beans General Information and Planning guide provides more background information about how these beans can fit into an enterprise systems, and what kinds of application can be written with the beans.

A JavaBean is a reusable Java component. JavaBeans, commonly referred to as "beans", can be low-level or combined into higher-level beans that can be used over and over to create applications.

The DirectTalk Beans are high-level beans for components of a typical voice response application, such as Menu, MenuItem, Form, Announcement, and EntryField. These beans are similar to the beans used for creating graphical user interfaces: Menu, MenuItem, Label, TextField, and so on. Any differences in terminology reflect the essential differences between auditory and visual interfaces. Someone who has developed a graphical user interface can, by using the beans, develop an equivalent interactive voice response application to support the same end-user tasks, for example, to add, change, delete, and review records in a database. The DirectTalk Beans comprise: The DirectTalk bean, Action beans, Media data beans, The EventFilter bean, and Compatibility beans.

The DirectTalk bean establishes communication between a Java voice application and the base DirectTalk system, and also provides access to simple call control functions: waiting for a call, returning a call when finished, making an outgoing call, and handing a call over to another application. Other call control functions, such as call transfer and conferencing are handled by the call control beans.

The action beans can be thought of as "voice interface widgets", which use an action method to present or "play" output to the caller and, in some cases, accept input (which can be key input or voice). Menu allows a caller to press keys or say command words, to select an option. The Menu bean itself handles all the usual error conditions: timeout, invalid key entered, and so on. MenuItem includes both the voice description for the item, and the telephone key or speech recognition word that is associated with selecting it. EntryField allows the caller to enter data, by pressing keys or speaking. The EntryField includes both the voice description and the length of time allowed, and, if necessary, the key to be recognized as an ENTER key. The EntryField bean can easily be extended to allow checking for various formats: currency, date, credit card number, and so on.

Media data beans specify the sounds that the caller hears. To help one to create international applications, these beans have a locale property, which specifies country and language if applicable. A style property allows different presentation styles when appropriate. The media data beans cannot "play" themselves to the caller: they are played by the Action beans: E.g. VoiceSegment specifies recorded voice data. The VoiceSegment bean is used both for output and for input recorded by the VoiceRecorder bean. AudioCurrency specifies a currency amount to be spoken.

The EventFilter bean. Normally one would take different actions depending on whether a bean is successful or fails. The EventFilter bean makes it possible to fine-tune the next action, according to the exact completion code from a bean.

The Compatibility beans are provided to maintain compatibility with DirectTalk for AIX state tables and DirectTalk/2 or DirectTalk for Windows user actions. The recommended approach to new voice application development is to use the Java beans for all applications. But if one already has voice applications to integrate with new Java applications, the compatibility beans provide the means. E.g, The StateTable compatibility bean invokes a state table. The UserAction compatibility bean can invoke user action. The UserActionVariable compatibility bean allows a user action to access system variables.

All of the base DirectTalk products use the concept of "language", and some languages are defined in terms of language and the country it is spoken in: for example, Canadian French as opposed to French spoken in France. In Java, this is explicitly acknowledged, by using the term locale to refer to language-and-country. Each locale is identified by an ISO-defined code, which comprises a language component and a country component: for example, fr_CA for Canadian French and fr_FR for French in France. Optionally, personalized locale identifiers can be created, including an optional user-defined variant. For example en_US_fred. The maximum length of a locale identifier in the DirectTalk Beans is 18 characters, so the variant part can be up to 12 characters.

Locale is used for identifying precisely what is to be spoken to the caller: the words, accent, and phrasing used (by using the variant component of the locale identifier, you can also specify any other characteristics you want). In other words, locale is used to identify the voice segments to be used. It is also used for determining the technology to be used for text-to-speech and speech recognition. Furthermore it may optionally alter the logic of your application.

A Locale has the format 'll_CC_vvvvv' where: ll is the language code, such as "en" for English, "fr" for French; CC is the country code, such as "US" for the United States of America, "GB" for the United Kingdom; and vvvvv is an arbitrary string of arbitrary length limited to 12 characters in DirectTalk Beans, such as "mobile", "landline", "Yorkshire". The language and country codes are usually taken from those defined in the ISO standard.

Each IVR system node has a default locale and optionally each application can have a default locale, overriding the system default locale. An application developer can specify the default locale in the Application Properties. Furthermore it is possible to override the system default locale when the application is executing. When the application starts, the current locale is either the system default locale or the application default locale, if one has been specified. The current locale affects only the running of this instance of the voice application: it does not affect anything else in the Java Runtime Environment.

Each bean can have its locale property set but to make an application completely language-independent, one should not specify the locale on any Media data beans. To make the application speak a specific language, simply set the default locale of the system: all applications in that node will speak that language. Instead of using the system default locale, one could specify a default locale for each application, and have applications speaking different languages running in the same system. Alternatively, the current locale can be set dynamically from within the application as it runs. Thus, the current locale provides full internationalization for your applications, provided that each DirectTalk Beans language is installed on the voice response node.

Normally, the current locale only affects the voice segments chosen to be played to the caller. But one can access the locale currently being used by the application, to determine the logic of the application.

Current locale is useful but one might want to specify the locale on the individual Media data beans in a multilingual application, where more than one language is needed. For example, you might have an application that asks the caller which language they want to use, with a voice segment for each language option. In such an application, you might want to set the current locale dynamically, after asking the caller which language they want. This would make the remainder of the application international.

It is up to the application developer how to use the user-defined variant component of the locale identifier. One might record voice segments for an application using different voices: male and female, for example.

A developer might identify these voice segments as, for example, en_US_male, en_US_female.

A developer might have a different greeting at the beginning of an application, depending on which branch of your company the call is for, even though the logic of the application is the same for all branches. To achieve this, a locale identifier is created for each branch (for example, en_GB_romsey, en_GB_winchester, en_GB_salisbury). Then name each greeting voice segment using the appropriate locale identifier, and use different default locales to run instances of the application for each branch. The other voice segments in the application, common to all branches, should be in the base locale (en_GB).

Whenever a voice segment for a specific variant cannot be found, a voice segment for the country and language is searched for so, for example, if the current locale is en-GB-romsey and the required segment is "balance" then the system will first search for "balance" in en-GB-romsey, then if it is not found search for "balance" in en-GB.

In some cases, a developer may want to use a language-only locale identifier, such as "en" or "fr". These voice segments can be used when the current language of an application is any derivative of the en locale: en_US, en_GB, en_AU, and so on. Whenever a voice segment for a specific country cannot be found, a voice segment for the generic language is searched for.

Because some speech recognition and text-to-speech technologies are better at some languages than others, one can use different technologies for processing different languages. You specify one technology for "all locales" and then override this for the exceptional languages. This can be specified on a per node or per application basis. Specifying the technology for a new language or switching between technologies for any language is done without altering the application itself.

The Current application locale is assumed for all speech recognition attempts, and is used for text-to-speech unless specified on the TextToSpeech bean.

One can set the locale to be used while the application is running, either on the basis of the calling number or some other criteria (for example, a menu that asks the caller which language they want).

The DirectTalk bean has a currentLocale property with corresponding get and set methods. When makeCall or waitForCall is invoked, the currentLocale property is set to the Default locale.

To change the locale during the application, invoke the setCurrentLocale method of the DirectTalk bean that initiated the call to set the new locale. This method sets the currentLocale property and passes the locale to the voice response node; this locale is now the locale used by the application.

When an application finishes with the call and starts to handle a new call, the current locale is reset to the default locale, rather than a locale that the application had switched to during the previous call. To reset the locale back to the default locale during a call, invoke the setCurrentLocale method of the DirectTalk bean that initiated the call, passing it a null parameter. To determine what locale the application is currently using, invoke the getCurrentLocale method of the DirectTalk bean that initiated the call: this returns the currentLocale. You can change the behavior of the application, if necessary, depending on this value.

Not all applications are completely language-independent. You might want to mix the languages spoken by a single application. In this case, rather than changing the current locale, use the locale property of individual media beans to override the current locale.

Normally, the locale property of the media beans is not set, so that the default locale is used at runtime. This makes it very easy to develop an international application that automatically adapts itself to the local requirements (for example, in France, users hear French voice segments and in Britain, users hear U.K. English voice segments). However, you can override the default locale by specifying a locale for the bean, for example, to develop a multilingual message.

Speech recognition in DirectTalk Beans Environment can be used without hard-coding the speech recognition technology inside the application. This means that you can switch from one technology to another without changing the application. In addition, different technologies can be used for different languages, again, without hard-coding anything in the application. (DirectTalk Beans applications are fully language-independent.) To achieve this independence from technology and language, the plug-in class to be used for any individual recognition attempt is found using RecoService configuration entries and RecoDefinitions.

A RecoService configuration entry exists for each plug-in on each operating system platform you use in your Direct-Talk Beans Environment plex. Each voice response system has a NodeName configuration entry, in which the relevant RecoService entries are identified. A RecoDefinition contains two items of information: RecoType and locale identifier. RecoType is a platform-independent name for the speech recognition technology. The locale identifier identifies the languages for which this technology is to be used. The locale identifier can be an asterisk (*) indicating "all locales".

A set of RecoDefinitions can be stored in the NodeName configuration entry. These definitions apply to all applications run in the node, unless the RecoDefinitions are stored in an application's ApplicationProperties (while the application is being run from a visual builder or using the jre or java command) or in the AppName configuration entry (when the application is run in a node). When an EntryField or Menu bean attempts to use speech recognition, the current locale of the application is used to find the appropriate RecoDefinition. The ApplicationProperties or the AppName configuration entry is searched first, and if a RecoDefinition is found for the locale, or for "all locales", it is used. If no RecoDefinition is found for the locale, the NodeName configuration entry is searched.

The configuration entries needed for text-to-speech work in exactly the same way as the Configuration entries needed for speech recognition. Text-to-speech in DirectTalk Beans Environment can be used without hard-coding the text-to-speech technology inside the application. This means that you can switch from one technology to another without changing the application. In addition, different technologies can be used for different languages, again, without hard-coding anything in the application. (DirectTalk Beans applications are fully language-independent.) To achieve this independence from technology and language, the plug-in class to be used for converting text to speech for any individual TextToSpeech bean is found using TTSService configuration entries and TTSDefinitions.

Figure 2:
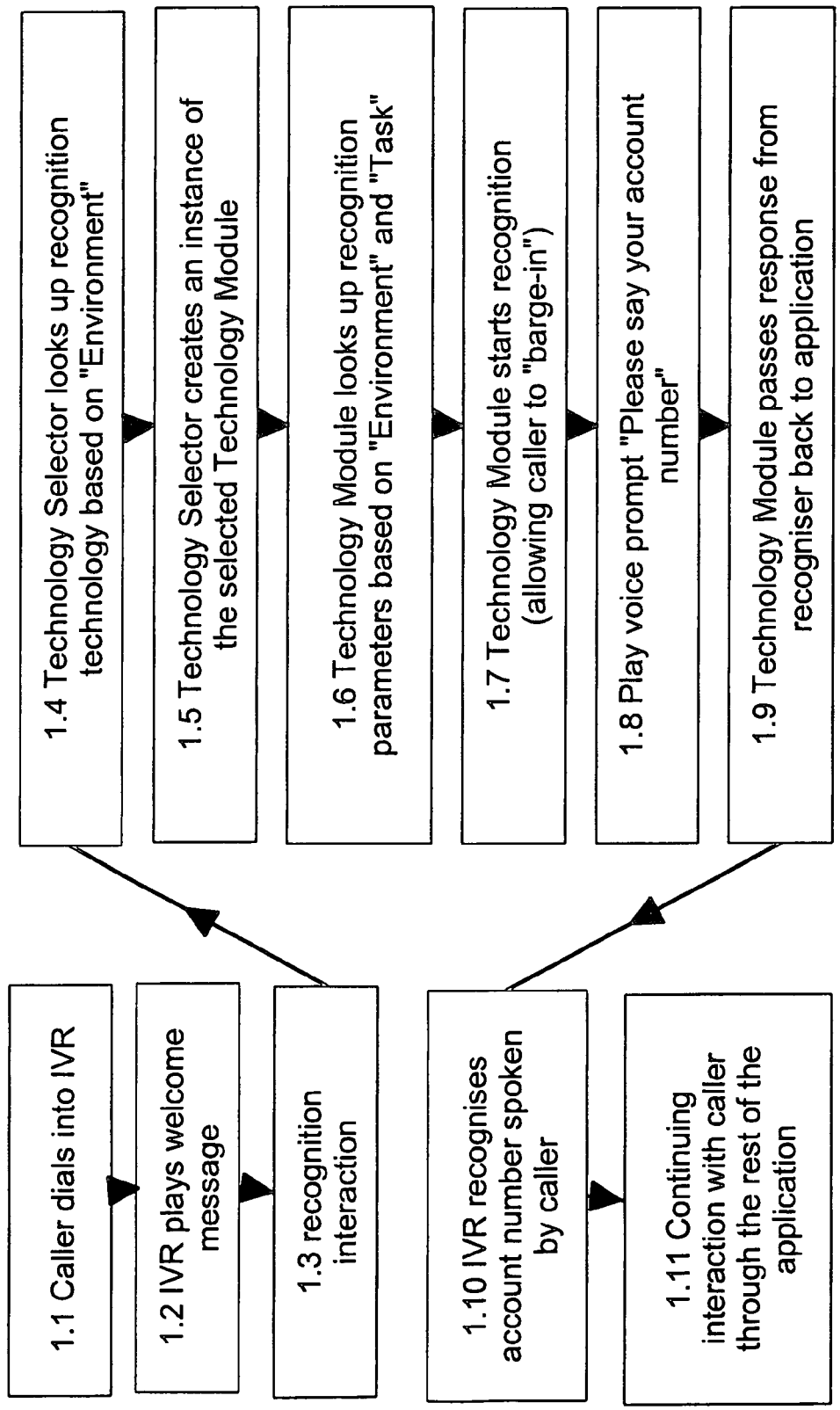
FIG. 2 represents the steps of the method of the present embodiment.

The steps of the method of the invention are described with reference to FIG. 2. At step 1.1 the Caller dials from a telephone through the PBX into the IVR and an application is opened to handle the call. A welcome message as specified by the application is played (step 1.2) to the caller over the open telephone line using defined prompts or text and a text to speech module. An IVR application instruction to initiate a recognition interaction (such as a field entry bean) is located (step 1.3) and speech technology is needed to perform the recognition interaction. Program control is passed to the technology selector which acquires the environment from the application instruction or from the application itself and then looks up (step 1.5) an appropriate speech technology from the hash table. The technology selector creates (step 1.6) an instance of the selected speech technology. Next technology selector chooses (step 1.7) an appropriate set of parameters for the speech technology by looking in the parameter hash table based upon the environment property of the interaction and now the actual task property of the interaction. Once the parameters have been chosen, the speech technology starts the interaction (step 1.8). A voice prompt is played (step 1.9) e.g. "Please say your account number". A response is received and passed (step 1.10) from recogniser back to application. The IVR is able to recognise (step 1.11) the account number spoken by caller and enter It into a field for processing. The next instruction in the IVR application is acquired (step 1.12) and the interaction with caller is continued through the rest of the application.

The parameters for a speech recognition operation will depend on the technology in use. Two examples are given here: Philips Speech Processing (formerly known as Voice Control Systems or VCS) and IBM ViaVoice.

For Philips Speech Processing (PSP) it is necessary to select a vocabulary file and the sub vocabulary within that file. The vocabulary file is named according to the following:

llcctnsv where:
ll is a 2-letter language code
cc is a 2-letter primary country code
t is a single letter specifying the technology:
D Discrete
U Discrete/Cut-thru
A Alphanumeric
W Continuous
n is a single digit specifying the number of channels per DSP
s is a single digit specifying the number of sub-vocabularies
v is a single letter specifying the vocabulary version.

An example is ENUSD82A, which gives 8 channels of discrete recognition for US English. There are two sub vocabularies within this vocabulary files.

The sub vocabularies contain different set of words, such as numbers, simple control words and letters. For example the UNUSD82A vocabulary has two sub vocabularies as follows:

VOCAB 1:
0 yes
1 no
2 help
3 cancel
4 stop

VOCAB 2:
0 one
1 two
2 three
3 four
4 five
5 six
6 seven
7 eight
8 nine
9 zero
10 oh
11 stop PSP needs parameters from the vocabulary and sub vocabulary, and both are dependent on both the locale and task. The locale is used to determine the language and country of the vocabulary and the task to determine discrete, continuous, alphanumeric vocabulary. Determination of the sub vocabulary will depend on the task and also on the vocabulary, since vocabularies for different languages, countries etc. have differing sub vocabularies.

For the implementation of ViaVoice on IBMs DirectTalk products, the parameters required to start recognition are an "engine" name and one or more grammar names.

The engine name selects a specific language model for the recognition—so, for example there will be a different engine name for each language, and for language models within a language that are set up for calls from land line or mobile telephone networks. The engine names are user definable and may vary from one installation to the next for the same type of engine—thus it is important that this information is contained in the configuration of the installation, rather than within the application. The engine name is clearly dependent on the locale.

The grammar names select which recognition grammars will be used for the recognition, and so determine the possible results. Multiple grammars may be used for example to recognise numbers and help words at the same time. The grammar names are clearly dependent on the task required.

In the present embodiment the environment is represented by a locale string that represents the language, the country and a "variant". The variant can be used to select for example land line, mobile or IP telephony language models, or regional variations in the language, or a combination of the two. The application takes information that it knows about the environment of the call and creates this locale string.

In an alternative embodiment, some or all of the environment information is gathered by the system and the locale string is created automatically. Factors such as the gender, language and local dialects can be determined by analysis of the callers voice. The type of telephone from which the call comes, land line, mobile or Internet telephony, may be determined from the calling number which is usually available to a voice response system.

Now that the invention has been described by way of a preferred embodiment, various modifications and improvements will occur to those person skilled in the art. Therefore it should be understood that the preferred embodiment has been provided as an example and not as a limitation.

What is claimed is:

1. An interactive voice response (IVR) system having:
a plurality of speech technology software modules, at least one of the modules comprising a speech recognition engine comprising a plurality of different language models, each different language model corresponding to a different type of voice channel for recognizing speech input from a user, at least one other of the modules comprising a text-to-speech engine for generating speech output for a user, and at least one other of the modules comprising a tone-recognition module for recognizing a plurality of pre-selected tones;
a voice application defining a plurality of interactions between a caller and the speech technology modules, each interaction having a task property and an interaction environment property; and
a speech technology selection module for selecting, for each interaction, one of the speech technology modules from the plurality of the modules to be used by the application according to the environment property of the interaction;
wherein the environment property comprises a call-type identifier that indicates when a call is a landline type call, a mobile type call, and an IP telephony type call, and wherein one of one of the plurality of different language models is used by the speech recognition engine depending on the call-type identifier.

2. An IVR as in claim 1 further comprising:
a plurality of parameter sets associated with each speech technology module;
a parameter selection module for selecting one of the parameters sets for use with the selected speech technology module according to the environment property of the interaction and the task property of the environment.

3. An IVR as in claim 1 wherein the environment property comprises a language identifier.

4. An IVR as in claim 1 wherein the environment property comprises a regional identifier.

5. An IVR as in claim 1 wherein the application defies the application environment property and wherein the environment property of an interaction takes priority.

* * * * *